US007956934B2

(12) United States Patent
Han et al.

(10) Patent No.: US 7,956,934 B2
(45) Date of Patent: Jun. 7, 2011

(54) DIGITAL TV EQUIPPED WITH UNIVERSAL CPU AND METHOD FOR SIGNAL PROCESSING THEREFOR

(75) Inventors: Hee-chul Han, Seoul (KR); Se-huhn Hur, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1238 days.

(21) Appl. No.: 11/560,596

(22) Filed: Nov. 16, 2006

(65) Prior Publication Data

US 2007/0130614 A1  Jun. 7, 2007

(30) Foreign Application Priority Data

Dec. 5, 2005  (KR) .................. 10-2005-0117667

(51) Int. Cl.
*H04N 5/44* (2006.01)
(52) U.S. Cl. .................. 348/725; 348/730; 348/731
(58) Field of Classification Search .................. 348/725, 348/730, 731, 552, 553, 714, 719
See application file for complete search history.

(56) References Cited

U.S. PATENT DOCUMENTS

| 5,838,383 | A | * | 11/1998 | Chimoto et al. ............... 348/553 |
| 6,788,352 | B2 | * | 9/2004 | Kim ............................. 348/553 |
| 2002/0024616 | A1 | | 2/2002 | Kim |

FOREIGN PATENT DOCUMENTS

| JP | 2002-351446 A | 12/2002 |
| KR | 1998-0039648 A | 8/1998 |
| KR | 10-2002-0015848 A | 3/2002 |

* cited by examiner

*Primary Examiner* — M. Lee
(74) *Attorney, Agent, or Firm* — Sughrue Mion, PLLC

(57) ABSTRACT

A digital TV equipped with a general-purpose CPU having a higher performance than that of an embedded CPU and a signal processing method thereof are provided. According to the digital TV and method, if the digital TV is turned on, digital broadcast data is received and decoded irrespective of whether or not system booting is completed, and while the system booting is performed, the decoded signal is made to be output to a display apparatus. Accordingly, after the digital TV is turned on, a user does not need to wait until the system booting is completed and can watch the digital broadcasting while the booting process is being performed.

10 Claims, 4 Drawing Sheets

DIGITAL TV EQUIPPED WITH UNIVERSAL CPU AND METHOD FOR SIGNAL PROCESSING THEREFOR

CROSS-REFERENCE TO RELATED PATENT APPLICATIONS

This application claims priority from Korean Patent Application No. 10-2005-0117667, filed on Dec. 5, 2005, in the Korean Intellectual Property Office, the disclosure of which is incorporated herein in its entirety by reference.

BACKGROUND OF THE INVENTION

1. Field of the Invention

The present invention relates to a digital TV and more particularly to a digital TV equipped with a general-purpose CPU and a signal processing method therein.

2. Description of the Related Art

As the convergence trend of digital consumer electronic appliances has been accelerated, a digital TV with which digital broadcasting can be watched has begun to process applications, such as games and Internet browsers, in order to provide a variety of services to users in addition to reception of broadcasting. Accordingly, the digital TV now requires a high-end CPU capable of processing more data. Since the capability of an ARM or MIPS CPU that is a conventional embedded CPU is not enough to be used in a digital TV requiring a CPU with a 500 MHz or higher speed, a digital TV employing an x86 processor that is a general-purpose CPU instead of the conventional CPUs has been introduced.

FIG. 1 illustrates a structure of an ordinary x86 system.

As illustrated in FIG. 1, an x86 system can be split into two parts centering around a north bridge and a south bridge, respectively. The north bridge connects a CPU, a memory, and a PCI bus, and provides a high data rate. The south bridge manages relatively slow data lines connecting peripheral devices, such as a hard disc data line, a USB bus, and an ISA bus, and can be connected to the CPU through the north bridge.

When this system is applied to a digital TV, digital broadcast data received in an MPEG transport stream form is decoded by an MPEG decoder and the decoded broadcast signal is transmitted to a graphic processor through a PCI bus. Meanwhile, graphics related to an application, such as a web browser, is generated by the x86 CPU and transmitted to a video processor. The video processor synthesizes and processes the graphics and outputs the result to a display apparatus.

FIG. 2 illustrates a booting process in a conventional digital TV in which an x86 is mounted. Since an x86 system has a general-purpose architecture unlike an embedded system, if the power is turned on, the CPU, the system memory and peripheral device do not immediately communicate with each other and operate, and a series of booting operations are required. This booting process includes turning on the power supply, executing a BIOS program, loading an operating system, and loading device drivers. Only after this booting process is completed, elements of the system operate such that a user can watch digital broadcast and application graphics, such as a web browser. Since it usually takes 8-20 seconds to perform this booting process, the user has to wait until the booting process is completed after turning on the digital TV.

SUMMARY OF THE INVENTION

Aspects of the present invention relate to a digital broadcast reception apparatus enabling a user to watch digital broadcast even while a booting process is performed after power is turned on, and a signal processing method in the digital broadcasting reception apparatus.

According to an aspect of the present invention, there is provided a digital TV apparatus including: a digital television (DTV) module which independently receives and decodes digital broadcast data if power is turned on, irrespective of whether or not a booting of a system is finished; and a general-purpose central processing unit (CPU) which receives an input of a signal output from the DTV module through a predetermined port while the system booting is performed and outputs the signal to a predetermined display apparatus.

The DTV module may include a signal processing unit which changes a reception channel according to a channel change signal input by a user while the system booting is performed.

The remote controller signal processing unit may transfer an application control signal input by the user to the general-purpose CPU after the system booting is finished. The general-purpose CPU may be an x86 processor, and the port may be a video interface port (VIP).

According to another aspect of the present invention, there is provided a method of processing signal in a digital TV, the method including: independently receiving and decoding digital broadcast data if power is turned on, irrespective of whether or not a booting of a system is finished; and outputting the decoded signal to a predetermined display apparatus while the system booting is performed.

According to another aspect of the present invention, there is provided a general-purpose CPU apparatus used in a digital TV, the apparatus including: an input port which receives a signal obtained by decoding digital broadcast data; and an output port which outputs the input signal to a predetermined display apparatus while a system booting process is performed, wherein the signal is input by an external DTV module which if power is turned on, receives and decodes the digital broadcast data irrespective of whether or not the system booting is finished.

According to another aspect of the present invention, there is provided a method of processing a signal of a general-purpose CPU used in a digital TV, the method including: receiving a signal obtained by decoding digital broadcast data; and outputting the input signal to a predetermined display apparatus while a system booting process is performed, wherein the signal is input by an external DTV module which if power is turned on, receives and decodes the digital broadcast data irrespective of whether or not the system booting is finished.

According to still another aspect of the present invention, there is provided a computer readable recording medium having embodied thereon a computer program for executing the signal processing method of a general-purpose CPU in a digital TV.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Aspects of the present invention will now be described more fully with reference to the accompanying drawings, in which exemplary embodiments of the invention are shown.

Figure 1:
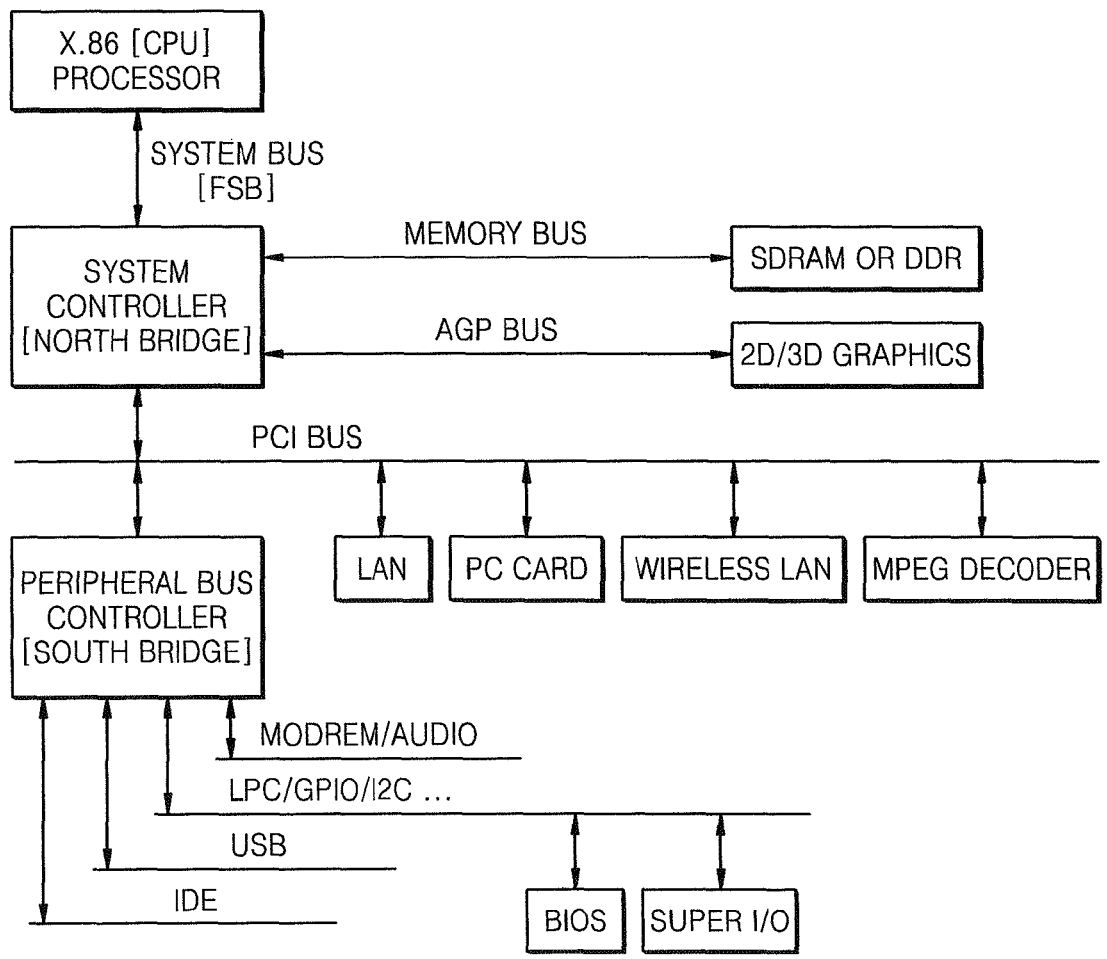
FIG. 1 illustrates a structure of a conventional x86 system.
Figure 2:
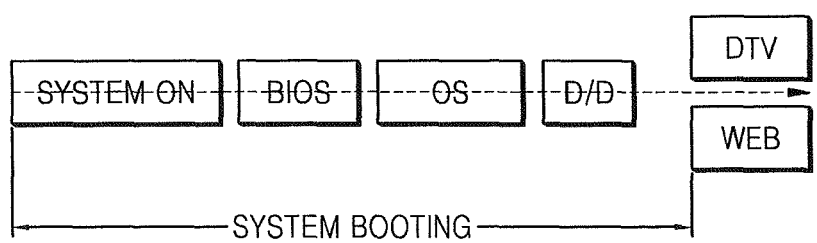
FIG. 2 illustrates a booting process in a conventional digital TV in which an x86 is mounted.
Figure 3:
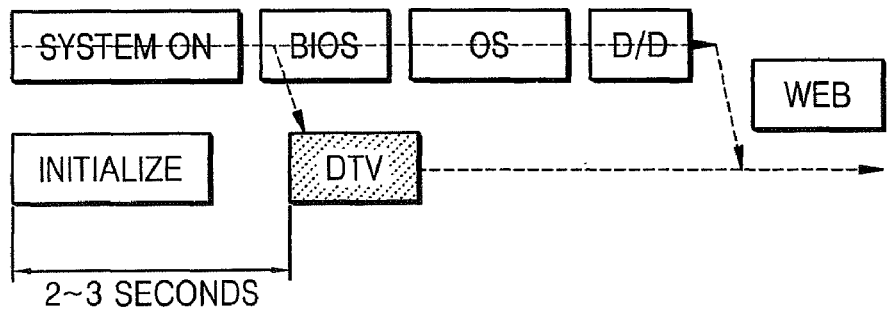
FIG. 3 illustrates a booting process in a digital TV according to an exemplary embodiment of the present invention.

FIG. 3 illustrates a booting process in a digital TV according to an exemplary embodiment of the present invention. The digital TV according to the exemplary embodiment of the present invention includes a digital television (DTV) module which receives digital broadcast, decodes and outputs the digital broadcast, if only power is turned on irrespective of whether or not a general booting process, including execution of a BIOS program, is finished. That is, if power is turned on in the system, while the booting process, composed of executing a BIOS program, loading an operating system, and loading device drivers (D/D), is being performed, the DTV module receives digital broadcast, decodes and outputs the digital broadcast such that a user can watch the broadcast on the TV screen even before the booting process is finished.

In this case, until the booting process is finished, device drivers are not fully loaded and therefore, applications, such as a web browser, cannot be executed. However, a remote controller signal processing unit capable of processing a remote controller signal to change a channel can be disposed in the DTV module so that even before the booting process is finished, the user can change a channel by using a remote controller. That is, according to the present exemplary embodiment, during a long booting time in a digital TV using an x86 processor, a function as a digital TV can be used though a variety of applications cannot be controlled.

Figure 4:
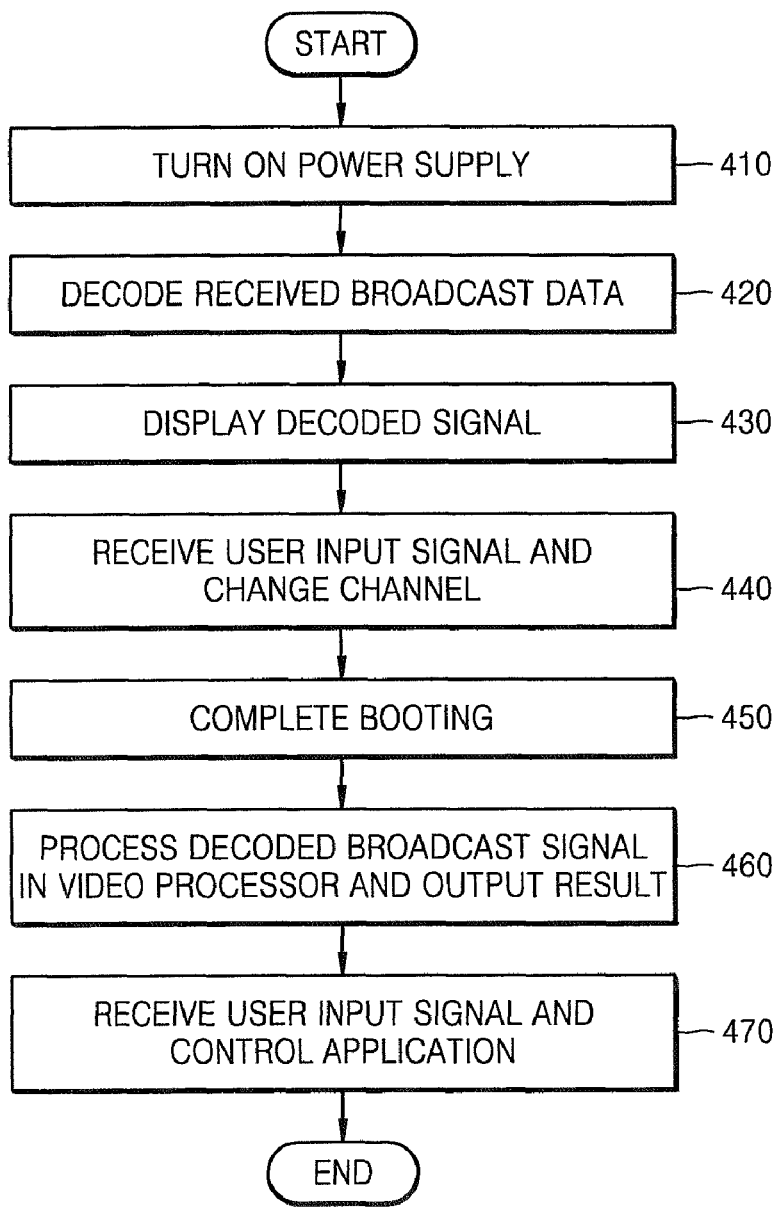
FIG. 4 is a flowchart illustrating a method of processing a signal in a digital TV according to an exemplary embodiment of the present invention.

FIG. 4 is a flowchart illustrating a method of processing a signal in a digital TV according to an exemplary embodiment of the present invention.

If a system is turned on in operation 410, irrespective of whether or not a BIOS program is executed, a DTV module is used to receive and decode digital broadcast data in operation 420. While the booting process is being performed, the decoded broadcast signal is transmitted to a display apparatus so that a user can watch the broadcast in operation 430. As described above, even before the booting process is finished, if a user input signal to change a channel is received, a reception channel is changed according to the received signal in operation 440.

If the booting process is completed and all elements are ready to operate in operation 450, the decoded broadcast signal is not directly output to the display apparatus as before, but goes through a processing process, such as synthesizing the signal with graphics related to a variety of applications and scaling the result, and then is output to the display apparatus in operation 460.

Operations of all elements of the system are available after the booting process is completed. Accordingly even if a user input signal indicating what cannot be processed in the DTV module itself, such as execution or termination of an application, is received, a variety of applications, such as a web browser and a game, are controlled normally according to the received signal.

Figure 5:
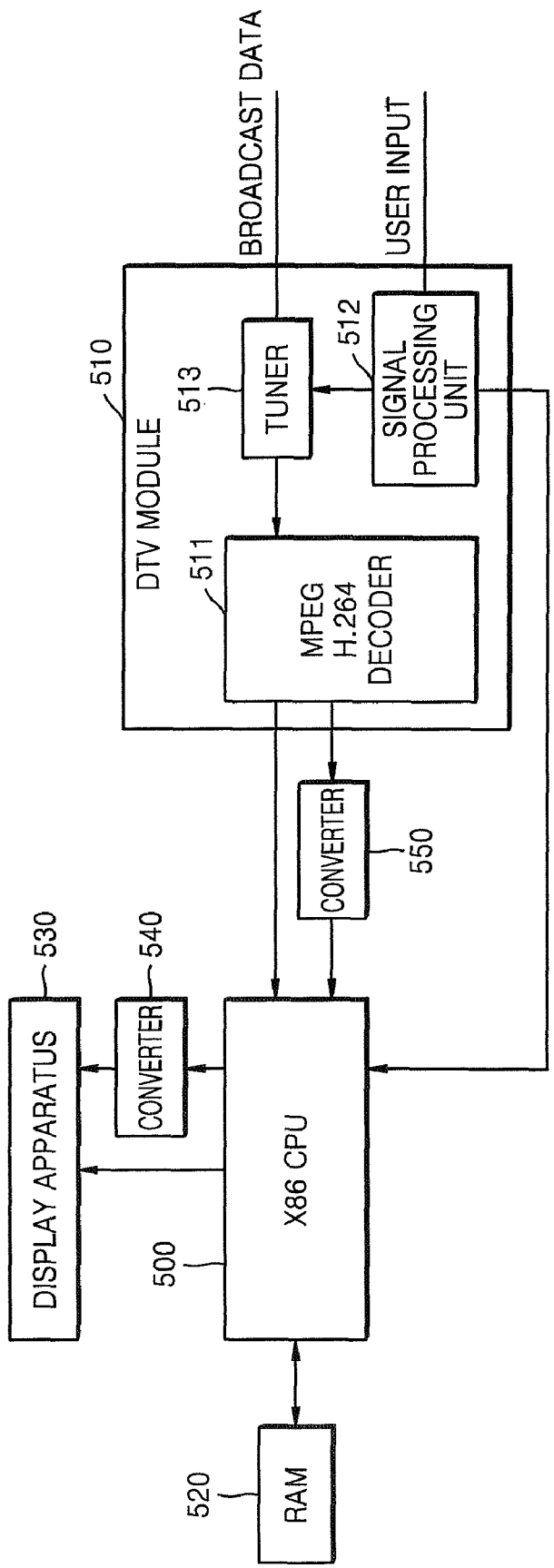
FIG. 5 is a block diagram of a structure of a digital TV according to an exemplary embodiment of the present invention.

FIG. 5 is a block diagram of a structure of a digital TV according to an exemplary embodiment of the present invention.

Referring to FIG. 5, the digital TV according to the exemplary embodiment of the present invention is composed of an x86 CPU 500, a DTV module 510, a RAM 520, and converters 540 and 550. The DTV module 510 includes a decoder 511, a signal processing unit 512 and a tuner 513.

As described above, the DTV module decodes received broadcast data irrespective of whether or not the booting process of the system is completed. The DTV module 510 may be mounted in the digital TV in the form of a chip, or may be implemented separately from the TV, for example, as a set-top box.

The decoder 511 receives and decodes broadcast data compressed in an MPEG or H.264 format, and then outputs the decoded result to the x86 CPU 500.

According to the present exemplary embodiment, even while the booting process is being performed, a signal output from the decoder 511 is received by the x86 CPU 500 and then should be transferred to the display apparatus 530. However, since a data bus, such as a PCI bus (not shown), cannot be used before the booting process is finished, the decoded signal is transmitted to the x86 CPU 500 through a video interface port (VIP) (not shown). The VIP is a DMA engine and a port that is used to transmit a video signal complying with a VESA 2.0 standard. However, since the VIP port is also driven only after the BIOS is executed, if power is turned on, the BIOS should activate the VIP port preferentially. Meanwhile, if the DTV module 510 does not support a VIP signal, a converter 550 which converts the output of the decoder 511 into a VIP signal may be employed.

The signal processing unit 512 receives a channel change signal input by the user while the booting process of the system is performed, and according to the signal, controls the tuner 513 to change a broadcast channel.

Before the booting process is finished, the user cannot control applications, such as web browsers and games, except changing a channel, but after the booting process is completed, if the user inputs a signal to control these applications, the signal processing unit 512 transfers the signal to the x86 CPU 500 so that the x86 CPU 500 can process the signal. This application control signal can be transmitted through a serial port such as an RS232.

The x86 CPU 500 transmits the broadcast signal received from the decoder 511 to the display apparatus 530 while the booting process is performed, so that the user can watch the broadcast even before the booting process is finished.

Also, after the booting is finished, the x86 CPU 500 synthesizes and processes graphics related to applications stored in a RAM 520 that is a system memory, and the broadcast signal received from the DTV module 510, by using a video processor embedded in the x86 CPU 500, and then transmits the result to the display apparatus 530. The x86 CPU 500 will be explained in more detail later.

If the x86 CPU 500 does not support the format of a signal that should be input to the display apparatus 530, a converter 540 that converts the output signal into a signal with a format suitable to the display apparatus may be disposed.

For example, if the signal generated in the x86 CPU 500 is in an RGB format, the converter 540 receives this and converts the signal into a YPbPr signal so that the display apparatus 530 can process the signal, and then outputs the signal to the display apparatus 530.

Figure 6:
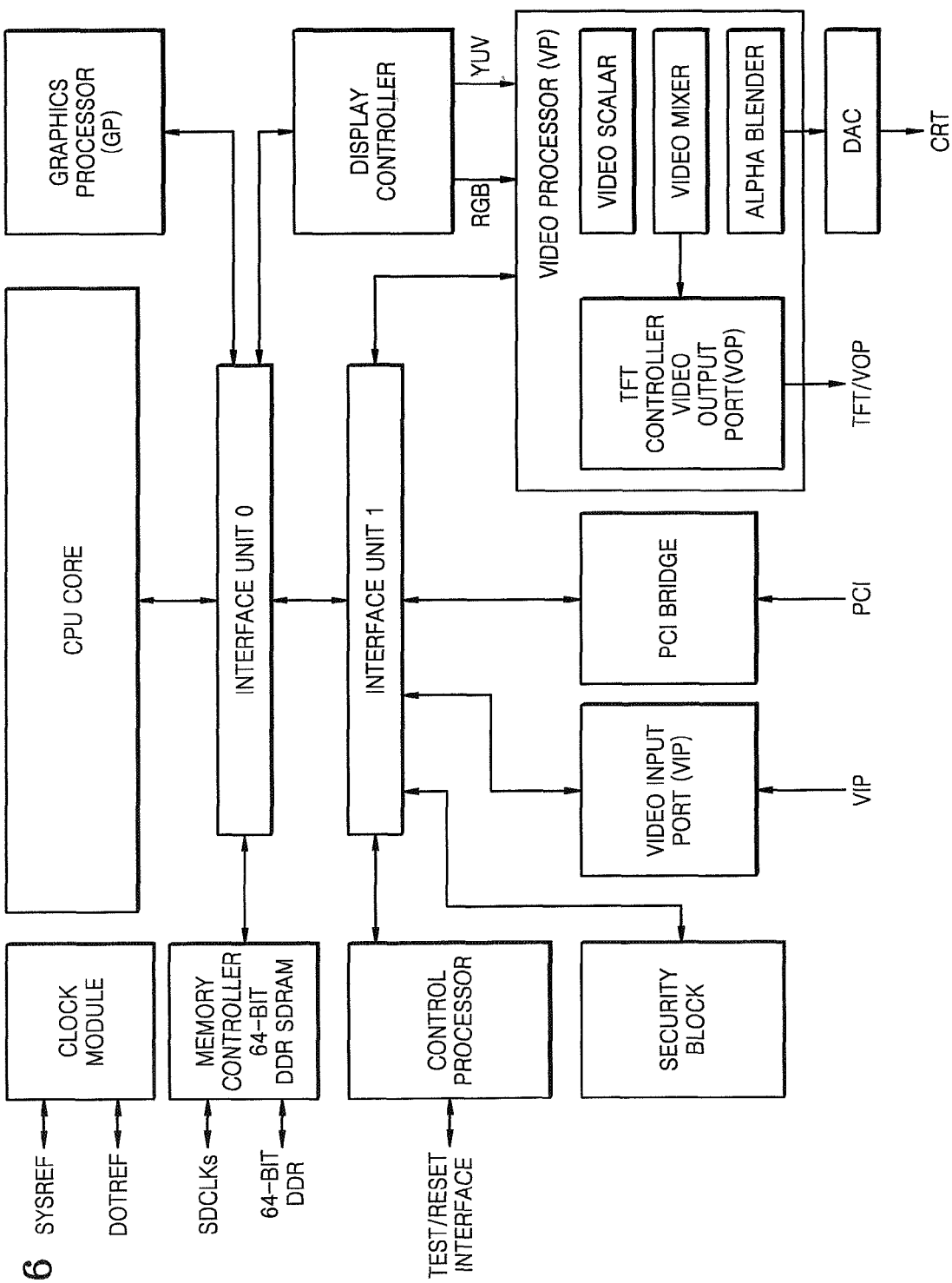
FIG. 6 is a block diagram of a structure of an x86 CPU according to an exemplary embodiment of the present invention.

FIG. 6 is a block diagram of a structure of an embedded x86 CPU according to an exemplary embodiment of the present invention.

As illustrated in FIG. 6, the embedded x86 CPU includes a VIP port for receiving a broadcast signal from a DTV module, interface unit 0 connecting high-speed modules, interface unit 1 connecting low-speed modules, a graphic processor generating graphics related to a variety of applications, a memory storing a broadcast signal and a graphic signal, a display controller fetching data to be displayed on a display apparatus from the memory, and a video processor processing a broadcast signal and graphics related to applications and outputting processed data to the display apparatus.

Before a booting process is finished, a broadcast signal output from the DTV module is input through the VIP port and then stored in the memory through interface units 1 and 0. The display controller fetches the broadcast signal stored in the memory and outputs the signal to the video processor.

The video processor transmits the broadcast signal input through the VIP port to the display apparatus so that a user can watch the digital broadcast even while the booting process is performed. Accordingly, a BIOS program should activate blocks required for the signal flow preferentially over the other blocks.

Then, if the operating system and device drivers are all loaded and the booting is completed, the graphic processor generates graphics related to a variety of applications, such as games and web browsers.

The video processor synthesizes the graphics generated in the graphic processor with the broadcast signal by using a video mixer, and performs a processing process of the result, such as scaling, by using a video scalar and alpha blender. Then, the video processor transmits the result to the display apparatus through a VOP port or DAC.

Aspects of the present invention can also be tangibly embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices.

Aspects of the present invention can also be embodied as computer readable codes on a computer readable recording medium via carrier waves (such as data transmission through the Internet).

While aspects of the present invention have been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in a descriptive sense only and not for purposes of limitation. Therefore, the scope of the invention is defined not by the detailed description of exemplary embodiments of the invention but by the appended claims, and all differences within the scope will be construed as being included in the present invention.

According to exemplary embodiments of the present invention, a digital TV employing a high-performance general-purpose CPU is made to receive a broadcast signal through a VIP from a DTV module that operates irrespective of whether or not a booting process is finished. By doing so, after the digital TV is turned on, a user does not need to wait until the system booting is completed and can watch the digital broadcast while the booting process is performed.

Also, a module to process a remote controller signal is implemented in a DTV module terminal so that the user can change a broadcast channel by using a remote controller even before the system booting is finished.

What is claimed is:

1. A digital TV apparatus comprising:
   a digital television (DTV) module which independently receives and decodes digital broadcast data if power is turned on, irrespective of whether or not a booting of a system is finished; and
   a central processing unit (CPU) which receives an input of a signal output from the DTV module through a predetermined port while the system booting is performed and outputs the signal to a predetermined display apparatus,
   wherein the DTV module comprises a signal processing unit which changes a reception channel according to a channel change signal input by a user while the system booting is performed.

2. The apparatus of claim 1, wherein the signal processing unit transfers an application control signal input by the user to the CPU after the system booting is finished.

3. The apparatus of claim 1, wherein the CPU is an x86 processor.

4. The apparatus of claim 1, wherein the port is a Video Interface Port (VIP).

5. The apparatus of claim 4, further comprising a converter which converts a signal output from the DTV module into a VIP signal and inputs the VIP signal to the port.

6. The apparatus of claim 2, wherein the remote controller signal processing unit transfers the application control signal to the CPU by using an RS232 interface.

7. The apparatus of claim 1, further comprising a converter which converts a signal output from the CPU into a signal with a format that can be processed by the display apparatus, and outputs the formatted signal to the display apparatus.

8. The apparatus of claim 7, wherein the converter converts an RGB signal into a YPbPr signal.

9. A method of processing a signal in a digital TV, the method comprising:
   independently receiving and decoding digital broadcast data if power is turned on, irrespective of whether or not a booting of a system is finished;
   outputting the decoded signal to a predetermined display apparatus while the system booting is performed; and
   changing a reception channel according to a channel change signal input by a user while the system booting is performed.

10. A computer readable recording medium having embodied thereon a computer program for executing a method of processing a signal in a digital TV, the method comprising:
    independently receiving and decoding digital broadcast data if power is turned on, irrespective of whether or not a booting of a system is finished;
    outputting the decoded signal to a predetermined display apparatus while the system booting is performed; and
    changing a reception channel according to a channel change signal input by a user while the system booting is performed.

* * * * *